Lindley & Perry.
Churn.
N°2,993. Patented Mar. 10, 1843.
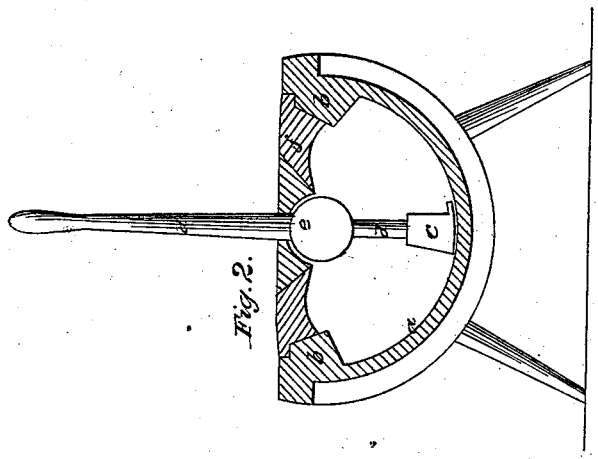
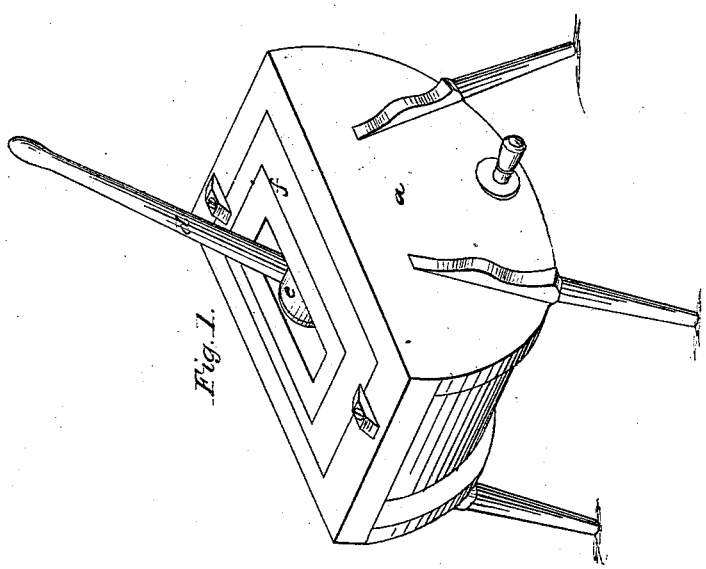

UNITED STATES PATENT OFFICE.

N. H. LINDLEY, OF REDDING, AND W. PERRY, OF BRIDGEPORT, CONNECTICUT.

CHURN.

Specification of Letters Patent No. 2,993, dated March 10, 1843.

*To all whom it may concern:*

Be it known that we, NOAH H. LINDLEY, of Redding, and WILLIAM PERRY, of Bridgeport, all in the county of Fairfield and State of Connecticut, have invented a new and useful Improvement in machines for Churning and Working Butter; and we do hereby declare that the following is a full, clear, and exact description thereof, reference being had to the following drawing, making a part of this specification, in which—

Figure 1 is a perspective view; Fig. 2, a vertical section.

The nature of our invention consists in so constructing a churn with a vibrating dasher as that a sufficient quantity of air can be admitted to the interior and the cream be prevented from being thrown out; the same machine also answering the purpose of working the butter after it is churned.

The outer case (*a*) of our churn is of a semi-cylindrical form, the curved part being downward; this is supported on four legs which raises it to the proper height. On each side of the curved part of the case, at the top there is a truncated wedge shaped piece (*b*) projecting inward about the width of the dash. The dash is a four sided prism (*c*) at the lower corner of which a rib projects on one side this is attached to a handle (*d*) by which it is worked. The handle (*d*) is a straight bar and passes up through a roller (*e*) which forms its fulcrum, and to which it is firmly attached; this roller is about half as long as the churn is wide in the clear, and its gudgeons extend out on each side and rest in steps in the sides of the churn in which they turn as the dasher vibrates. The cover (*f*) of the churn is flat on the top and nearly the whole size of the top of the can from the under side there is a projection downward the ends of which are beveled off to fit the upper side of the wedge pieces (*b*); from thence to the roller they are hollowed, with the curve of a circle; the roller is let into this cover about half its diameter the space cut out to receive it being a little larger than the roller so as to admit air into the churn around it; a slot is cut in the top of the cover which is beveled off down to the roller so as not to leave an opening into the churn at that point, the cover so constructed is buttoned tight down to its place when the churn is in operation.

When the cream is put into the churn and the cover fastened on the dash is put in motion and the cream thrown up against the wedge shaped pieces these project it forward and it strikes the curves on the cover and the roller and is precipitated down again into the center of the churn which operation is continued till the butter is made the construction of the cover preventing the escape of any of the cream. When the buttermilk is to be worked out of the butter it is put into the churn and pressed up and flattened out by the dash against the wedge pin as the dash recedes the inner end falls down and the edge of the cake of butter is presented to the dash which again squeezes it up against the top as before. This is repeated till the butter is sufficiently worked.

What we claim as our invention, and desire to secure by Letters Patent is—

1. The combination of the roller with the dash and staff in the manner and for the purpose set forth.

2. We also claim the combination of the cover constructed and arranged as before specified, with the case and dash in the manner described.

N. H. LINDLEY.
WILLIAM PERRY.

Witnesses:
JOEL FOSTER,
CARTER MARCHANT.